United States Patent [19]

Hodlewsky et al.

[11] Patent Number: 4,629,063
[45] Date of Patent: Dec. 16, 1986

[54] CHAIN LINK FOR A PRODUCT CAPTURING CHAIN

[75] Inventors: Wasyly G. Hodlewsky, Greendale; Roger H. Schroeder, Hartland, both of Wis.

[73] Assignee: Rexnord Inc., Brookfield, Wis.

[21] Appl. No.: 614,003

[22] Filed: May 25, 1984

[51] Int. Cl.⁴ .............................................. B65G 17/06
[52] U.S. Cl. ................................. 198/853; 198/690.2; 198/626
[58] Field of Search .............. 198/853, 698, 699, 648, 198/620, 604, 626, 628, 690.2

[56] References Cited

U.S. PATENT DOCUMENTS

| | | | |
|---|---|---|---|
| 2,297,296 | 9/1942 | Flintjer | 198/626 |
| 2,734,621 | 2/1956 | Mojonnier | 198/628 |
| 3,741,744 | 6/1973 | Bowman | 198/620 |
| 3,869,038 | 3/1975 | Piper et al. | 198/626 |

FOREIGN PATENT DOCUMENTS

| | | | |
|---|---|---|---|
| 213046 | 1/1961 | Austria | 198/628 |
| 2451331 | 11/1980 | France | 198/853 |

Primary Examiner—Joseph E. Valenza
Assistant Examiner—Kyle E. Shane
Attorney, Agent, or Firm—Richard C. Ruppin

[57] ABSTRACT

A chain link for a product capturing chain, including a pair of opposed retaining lips integral with the link for retaining the resilient gripping member.

3 Claims, 12 Drawing Figures

CHAIN LINK FOR A PRODUCT CAPTURING CHAIN

BACKGROUND OF THE INVENTION

This invention relates to conveyor chain, and, more particularly, to an improved conveyor chain for use in a product capturing conveyor.

Product capturing chains have been used in the past for elevating articles from one level to another in a conveyor system. These chains are made up of a roller base chain with a snap-on metal top plate having a resilient attachment. Two strands of chain are run parallel to each other so that the resilient attachments oppose each other, picking up articles in their path by squeezing the articles between two opposing resilient attachments. The chains are able to flex in order to raise or lower the articles being conveyed, and then the two strands of chain separate, depositing the articles on a platform or conveyor at a different level.

The present invention improves on those chains in several respects. The product capturing chains of the prior art included several different pieces—a roller chain, a snap-on top plate, and a resilient attachment. They were difficult and expensive to assemble due to the number of pieces and the method by which the attachments were held on the chain. The top plate included two welded-on studs, which were inserted into holes in the resilient attachment to retain the attachment. Welding was an expensive operation on each link, and, of course, the existence of welds provided a place for the assembly to fail. Also, the heat of welding might tend to distort the flight, so it would not run true on the supporting track. Welding also reduced the corrosion resistance of the parts. The holes in the resilient attachment provided a place for fatigue failure to begin as the attachment repeatedly flexed, picking up and releasing articles.

SUMMARY OF THE INVENTION

The purpose of the present invention is to provide an improved product capturing chain which has fewer pieces and is simpler and less expensive to manufacture and assemble than product capturing chains of the prior art. The present invention also provides a more reliable chain, because it eliminates welds on the top plate and holes in the resilient member, both of which might be sources of failure. In addition, the present invention is designed so as to provide smooth surfaces in contact with the resilient attachment member in order to avoid tearing or cutting that member, and it provides a design which is superior in reacting to any side thrust which might be exerted on the resilient member.

DESCRIPTION OF THE PREFERRED EMBODIMENT

Figure 2:
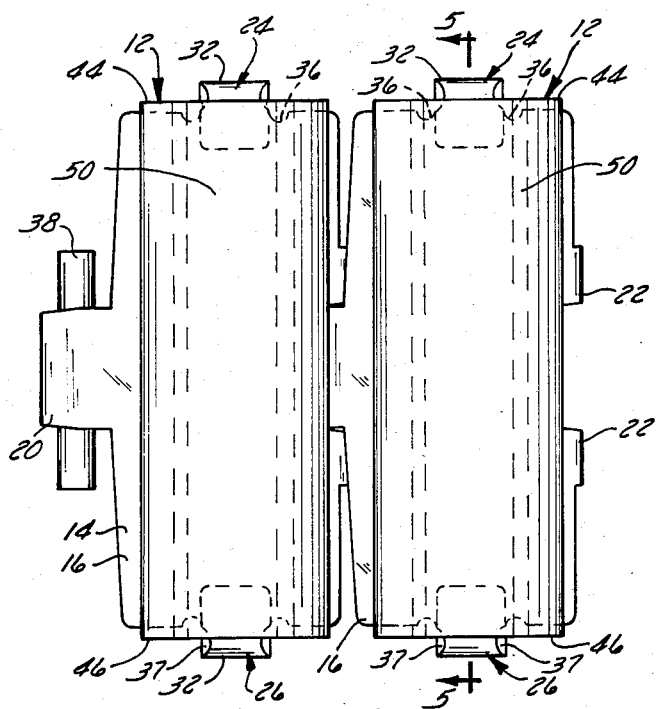
FIG. 2 is a top view of a chain made up of links identical to that shown in FIG. 1.

The chain link of the present invention is made up of a base link 10 and a resilient attachment 12. The base link 10 includes a flat base portion 14, which has a front surface 16, a back surface 18, forward and rear hinge eyes 20, 22 respectively projecting from its leading and trailing edges, and first and second opposed retaining lips 24, 26, which are integral with the flat base portion 14 and project from its first and second ends, respectively. Guide shoes 28, 30 are attached to the back surface 18 of the flat base portion 14, by any known method, such as by resistance welding.

Figure 9:
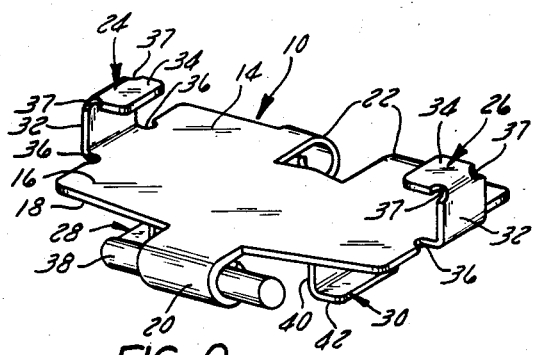
FIG. 9 is a perspective view of one of the links of the chain shown in FIG. 6.
Figure 11:
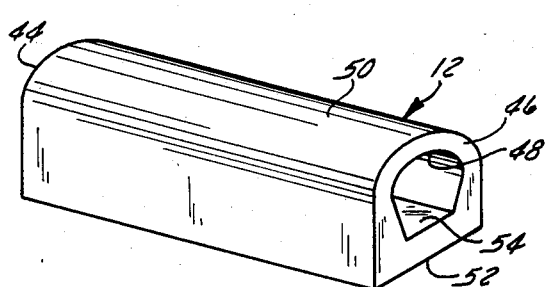
FIG. 11 is a perspective view of the resilient attachment which was shown on the link in FIG. 1.
Figure 10:
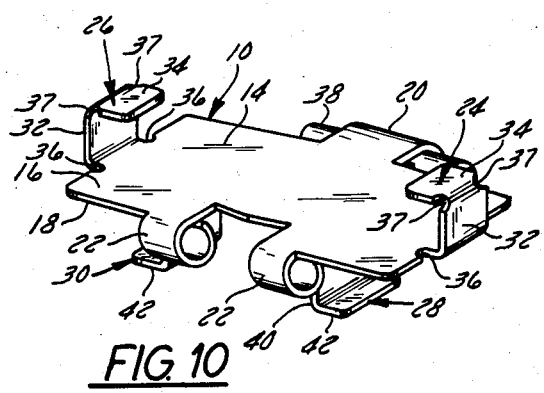
FIG. 10 is a perspective view of one of the links of the chain shown in FIG. 6.

Looking particularly at FIG. 9, it can be seen that each of the opposed retaining lips 24, 26 includes a first portion 32, which is substantially perpendicular to the flat base portion 14 and a second portion 34 which is substantially parallel to the flat base portion 14 and projects inward back the front surface 16 of the flat base portion 14. There are rounded indentations 36 on the flat base portion 14 where it intersects the opposed retaining lips 24, 26, and there are rounded indentations 37 on the forward and rear edges of the opposed retaining lips 24, 26, where the first portion 32 intersects the second portion 34. The rounded indentations 37 provide a smooth surface for contacting the resilient attachment 12 to avoid cutting that attachment. These rounded indentations 36, 37 also reduce stress concentration and permit the manufacturer to make sharp bends without tearing the material.

It should be noted that the hinge eyes 20, 22 do not project in the direction of the front surface 16 of the flat base portion 14 but instead leave that top surface 16 entirely flat except for the opposed lips 24, 26, which extend to a position opposite that surface. FIGS. 2, 3, 4, 6 and 7 show how the hinge eyes 20, 22 of adjoining links mesh with each other, permitting the links 10 to be connected by a pin 38 which is driven into the eyes 22 with an interference fit and which has a loose fit in the center eye 20, permitting the links 10 to side flex relative to each other for elevating or lowering articles from one level to another in the conveyor system.

Figure 5:
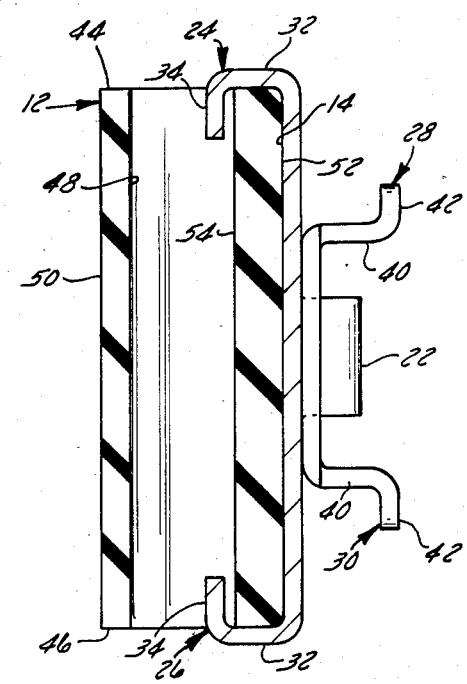
FIG. 5 is a sectional view of the link taken along the section 5—5 of FIG. 2.
Figure 3:
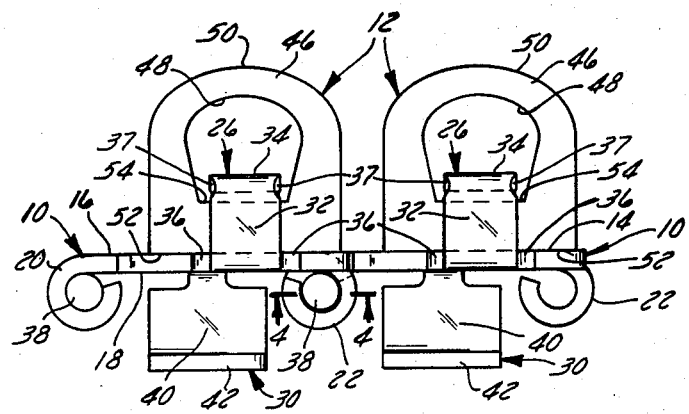
FIG. 3 is a side view of the chain shown in FIG. 2.
Figure 4:
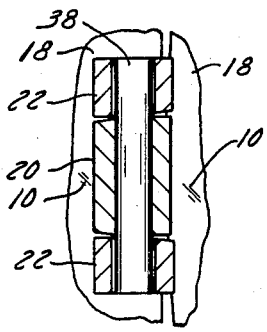
FIG. 4 is a broken away sectional view of the joint between two links, taken along the section 4—4 of FIG. 3.
Figure 1:
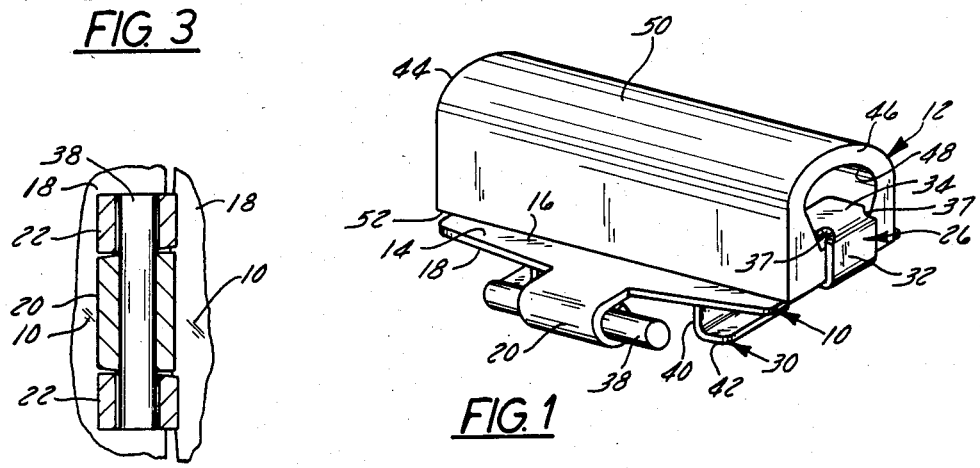
FIG. 1 is a perspective view of a chain link made in accordance with the present invention.
Figure 6:
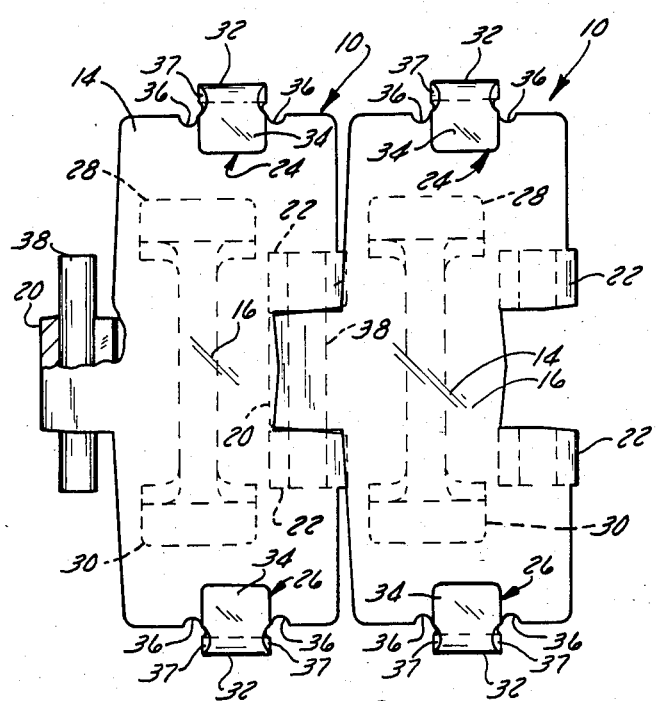
FIG. 6 is a top view of the chain shown in FIG. 2, with the resilient attachments removed.
Figure 8:
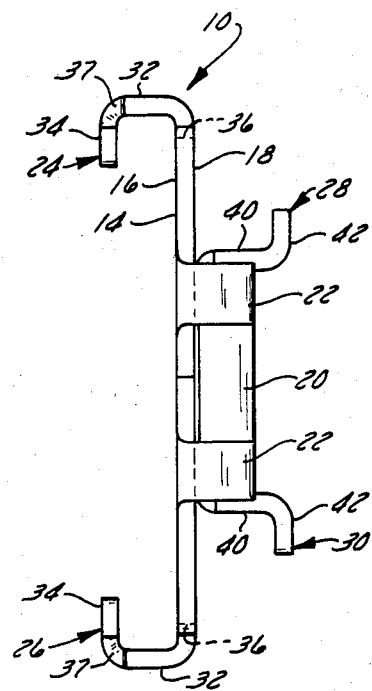
FIG. 8 is an end view of one of the links of the chain shown in FIG. 6.
Figure 7:
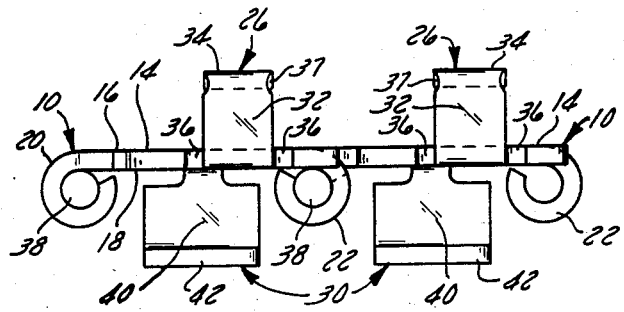
FIG. 7 is a side view of the chain shown in FIG. 6.

The general concept of guide shoes is detailed in U.S. Pat. No. 3,513,964, which is hereby incorporated by reference. It can be seen clearly in FIG. 8 that the guide shoes 28, 30 include a first portion 40, which is substantially perpendicular to the flat base portion 14, and a second portion 42, which is substantially parallel to the flat base portion 14, and which extends outward from the back surface 18 of the flat base portion. In a product capturing elevator, such as that shown in FIG. 12, the chains run in the position shown in FIGS. 2, 5, and 8, with the chain standing on end. In this position, the lower guide shoe 30 rides on a track or rail, with the first portion 40 of that guide shoe 30 supporting the weight of the chain on the rail as the chain is driven by sprockets (not shown). The upper guide shoe 28 also fits over a track or rail, with the second portion 42 of that guide shoe 28 serving to maintain the link 10 in a vertical position.

Figure 12:
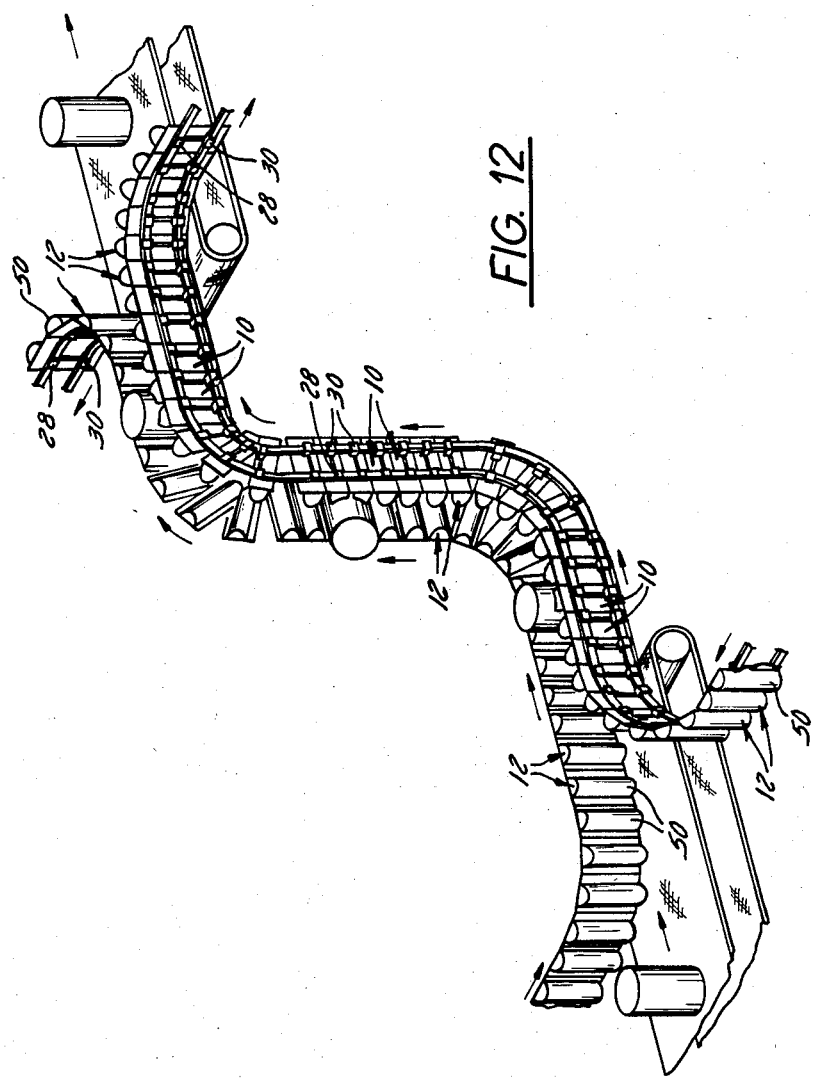
FIG. 12 is a schematic drawing of a conveyor system which uses the chain of FIGS. 1 through 11 to elevate articles from one level to another in the system.

The resilient attachment 12 may be more specifically referred to as a resilient, hollow, tubular gripping member, the function of which is to grip the articles to be carried by the product capturing conveyor as shown in FIG. 12. It may be made of any suitable resilient material, particularly of a urethane, rubber, or other suitable material. This gripping member 12 is approximately the same length as the flat base portion 14 of the base link 10, and it is retained on the link by means of the opposed retaining lips 24, 26. The gripping member 12 has first and second ends 44, 46 and inner and outer surfaces 48, 50. The outer surface 50 of the gripping member 12 includes a flattened outer surface portion 52, which lies against the front surface 16 of the flat base portion 14. The remainder of the outer surface 50 may have a number of different shapes, depending on the articles to be conveyed. Many shapes of gripping members are already known in the art. In this embodiment, the remainder of the outer surface 50 is semi-circular in shape; however, lengthwise ribs and various other shapes are also contemplated by this invention. The inner surface 48 of the attachment 12 also has a flattened surface 54, which is opposite the flattened outer surface portion 52. This flattened inner surface portion 54 has a width which is approximately the same width as the opposed retaining lips 24, 26, so that the lips contact this flattened inner surface portion 54 for retaining the attachment 12 on the flat base portion 14.

The retaining lips 24, 26 are centrally located on the link and occupy approximately one-third of the width of the link. This arrangement of the retaining lips is thought to provide the best retention while still leaving sufficient thickness to the resilient attachment so that it can function effectively. The retaining lips 24, 26 wrap around their respective ends 44, 46 of the tubular attachment and project inside the hollow portion of that attachment to retain it on the link.

The method for making and assembling the link 10 and attachment 12 are as follows: First, a flat base member is stamped from a sheet of metal, including projections for the hinge eyes 20, 22 and the lips 24, 26, and including the rounded indentations 36, 37. Next, the hinge eyes are bent in the direction of the back of the flat base member, and the retaining lips are bent in the direction of the front of the flat base member and formed into their final shape. Next, the guide shoes 28, 30 are attached to the back of the link 10. Next, the resilient gripping member 12 is installed on the base link 10 by fitting one of the retaining lips 24 or 26 around the end of and into the hollow portion of the gripping member 12; then the resilient member 12 is flexed so as to fit the other of the retaining lips 26 or 24 around its respective end of the gripping member 12; and then the gripping member is released, so that it rests on the flat base 14 and is retained by the lips 24, 26. The method for installing the resilient attachment may be reversed in the field for removing a damaged attachment, and a new attachment may then be installed as described above.

While the aforedescribed chain and chain link are the preferred embodiment of the invention, it will be understood by those skilled in the art that many modifications may be made to that embodiment without departing from the scope of the present invention.

What is claimed is:

1. A chain link for a product capturing chain, comprising:
    a flat base portion having front and back surfaces, first and second ends, and leading and trailing edges;
    hinge eyes projecting from said leading and trailing edges for connecting said link to the other similar links;
    at least one guide shoe projecting from said back surface for supporting said link on a track;
    a resilient, hollow, tubular gripping member approximately the same length as said flat base portion, having first and second ends and said inner and outer surfaces and including a flattened outer surface portion contacting said front surface of said flattened base;
    first and second opposed retaining lips integral with said flat base portion and projecting from said first and second ends, each of said lips including a first portion substantially perpendicular to said flat base and a second portion substantially parallel to said flat base opposite said front surface, the opposed retaining lips each being wrapped around one of the ends of said hollow, tubular gripping member and projecting inside said gripping member for retaining it on said flat base portion.

2. A chain link as recited in claim 1, wherein the inner surface of said resilient gripping member defines a flattened portion opposite the flattened portion on its outer surface, said flattened portion on the inner surface of said gripping member having approximately the same width as said opposed lips, so that said lips contact said flattened inner surface portion for retaining said resilient gripping member on said flat base.

3. A chain link as recited in claim 2, wherein each of said opposed lips includes forward and rear edges, each of said edges defining a rounded indentation at the intersection of said first and second portions of its respective lip, so as to provide a smooth edge for contacting said resilient gripping member.

* * * * *